United States Patent Office 2,902,612
Patented Sept. 1, 1959

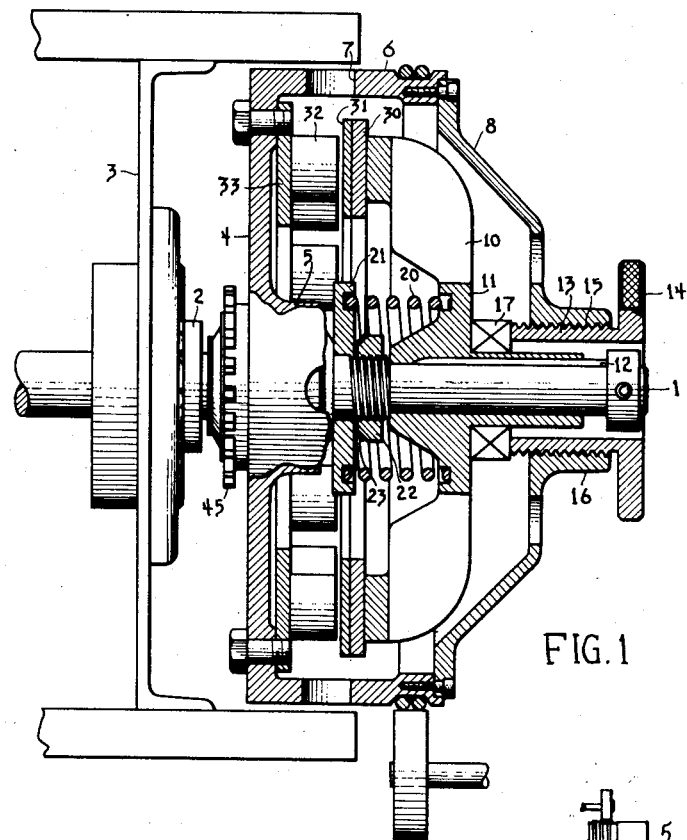

2,902,612

MAGNETIC CLUTCH

Robert L. Whearley, Fort Wayne, Ind., assignor to Rea Magnet Wire Company, Inc., Fort Wayne, Ind.

Application October 14, 1955, Serial No. 540,548

4 Claims. (Cl. 310—105)

This invention relates to clutches and is particularly directed to clutches which employ eddy-current constraint between a relatively rotatable magnetic pole and a metal plate and which is adapted to transmit variable quantities of power.

Magnetic brakes are known which comprise a rotor and a stator, one carrying a field pole and the other carrying a conductor which cuts the electromagnetic lines of the pole. Such brakes resemble the conventional induction-type motor. Such brakes, however, are not adapted as variable-slip clutches because the slip, or variable coupling between the relatively movable parts, are not readily adjustable.

The object of this invention is a magnetic clutch in which the degree of coupling between the driving and driven shafts of the clutch is easily adjustable.

The object of this invention is attained by a plate and a spider carrying, respectively, a magnet or a plurality of magnets, and a flat metallic annulus arranged face-to-face on the plate and spider, the plate being free-running on the shaft of the plate and the spider being splined to the shaft, with means for axially adjusting the spider along the spline to variably control the spacing between the pole faces and the annulus.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a sectional view of an assembly clutch, constructed according to this invention;

Fig. 2 is an elevation of an idealized clutch according to this invention;

Fig. 3 is a plan view taken on line 3—3 of Fig. 2; and

Fig. 4 shows one specific power application of the clutch of this invention.

The power input to the clutch assembly of Fig. 1 is through the shaft 1, the source of power, not shown, being coupled directly to the left-hand end of shaft 1. Shaft 1 could, for example, comprise the extended end of a motor, the main bearing 2 of which is mounted in the end bell 3 of the motor housing. The clutch plate 4 is centrally journaled on the shaft by bearing 5 of the low-friction type so that plate 4 is free-running on the shaft. For reasons which will presently appear, the plate 4 is relatively heavy in construction and is integrally cast with the cylindrical portion of the capstan 6 with ventilating holes 7, the outer end or cover plate 8 of the capstan 6 being detachably screwed to the cylindrical portion of the capstan 6. The plate 4, capstan 6, and cover 8 comprise a housing for enclosing the driving elements of the clutch.

The driving elements of the clutch are the spider 10 with radial spokes and hub 11 splined to shaft 1. The hub and spider are slidable axially along shaft 1 by means of the particular spline and key 12 which prevents rotation on the shaft. The axial position of the spider is finely controlled by the spindle take-up screw 13 with a knurled hand-wheel 14 at one end, and with screw threads 15 adjustable in complementary screw threads in the hub portion 16 of the cover 8. Hence, the inner end of the spindle take-up screw 13 is axially movable by adjusting the hand-wheel 14. The inner end of the take-up screw rides against one raceway of the thrust bearing 17, the other raceway being drive-fitted over the hub 11.

The hub and bearing are yieldably urged against the end of the take-up screw by coil spring 20 compressed between the hub 11 at one end and the collar 21 fixed to the shaft 1 as by tightening nut 22 and its stamped locking nut 23. In operation, as the take-up screw is withdrawn the hub 11 and its spider 10 follows in response to the action of spring 20.

The felly of the spider at the outer end of spokes 10 comprises a flattened metal ring or annulus 30. Preferably, annulus 30 is of iron, steel, or other paramagnetic alloys. According to another important feature of this invention, there is brazed or otherwise fastened to the face of annulus 30 a second ring 31 of a high-conducting non-magnetic metallic material such as copper or its alloys.

Opposite the face of the copper ring 31 is mounted a plurality of evenly spaced magnets 32, the magnets being arranged in a circle coaxial with the annulus 31. The magnetic pole of each magnet is machined flat and parallel to the face of annulus 31, alternate magnets in the circle being similarly polarized and the remaining magnets being reversely polarized. The magnets may be of the permanent type, or may be of the electromagnet type with leads for direct magnetizing current completed through slip rings, not shown. The magnets are preferably mounted on the iron ring 33 which in turn is stub-bolted to the plate 4, as shown.

As shown in Fig. 2, it will appear that the magnetic circuit between any two adjacent magnets 32 comprises the cores of the two magnets 32, the supporting plate 33 and the iron annulus 30, as well as the air gap between the pole faces of magnets 32 and ring 30. Such a magnetic circuit establishes a substantially rectangular path for the electromagnetic lines. It follows that if annuli 30 and 31 move relative to the face of the magnets 32, the metal of the face plate 31 cuts those lines. If, now, face plate 31 has good electrical conducting properties, substantial circulating eddy currents will be generated in the face plate. The drag between the relatively movable parts caused by the counter-electromotive forces of the eddy currents is proportional to field strength, cutting speed, and air gap length. According to an important feature of this invention, the air gap length is precisely and finely adjusted by hand-wheel 14. By tightening or advancing the take-up screw 13, the spacing between the pole faces and face plate 31 is reduced and the drag between the two moving elements is increased. While the percentage of slip in such an inductive machine cannot be reduced to zero, a very close approach to the value can be achieved. On the other hand, the withdrawal or backing off of the take-up screw 13 increases the air gap and reduces the torque and speed. For any given load placed on the driven assembly 4, 6 and 8, the amount of slip, and speed reduction, can be adjusted at will. The clutch of this invention is particularly useful where the load is variable and where the inertia of the driving motor cannot readily follow rapid changes of speed.

Many methods of taking off power from the driven housing 4, 6, 8 now become apparent. For example, a sprocket or gear 45 may be fixed to the hub 5 as shown in Fig. 1, or if desired gears or belting may be applied to the outer circumference of the capstan 6.

As will become evident from the following, this invention may be employed for maintaining constant tension on wire as it leaves various types of wire-handling devices such as (1) wire-enameling ovens, (2) annealing furnaces, (3) wire-drawing equipment, and (4) other wire-processing equipment. In one application of this invention, as shown in Fig. 4, the clutch is employed for maintaining constant tension on wire as it leaves an annealing furnace, the clutch serving also to feed the wire into annular drums or onto conventional spools. The wire 40 is passed around the capstan 6 two or three times to frictionally engage the wire and drag the wire from its processing equipment and feed the wire into the drum 41. The drum is rotated to coil the slack wire into the drum as it plays off from the capstan, the drum being conveniently driven through the bevel gears 42, sprocket 43, chain 44, and sprocket 45 mounted on hub 5 of the clutch. Motor 46 must be sufficiently powerful to drag the heaviest wire and accordingly must have considerable inertia. Inasmuch as the wire being drawn and stored will vary considerably in tension, the capstan 6 must respond immediately to such changes in pull. The adjustable slip provided by the magnetic clutch by this invention is admirably adapted to such a load.

Thread winding is another application requiring a steady pull with a definite upper threshold value of pull, to which the clutch of this invention is admirably adapted.

While I have described above the principles of my invention in connection with specific apparatus, it is to be clearly understood that this description is made only by way of example and not as a limitation to the scope of my invention.

What is claimed is:

1. A clutch assembly comprising a driving shaft, a clutch housing journaled and free-running on the shaft, a spider with a hub splined to the shaft so that the felly of the spider and the housing are relatively axially adjustable to provide an air gap therebetween, said housing extending over said spider enclosing the spider and having an axial opening, means extending through said axial opening to magnetically couple the felly with the housing, and means to fixedly adjust the axial position of the spider and the air gap between the felly and housing comprising an adjustable element carried by said housing and co-operating with said hub to provide adjustable displacement of the spider with relation to said magnetic coupling means.

2. A clutch assembly comprising a shaft, a clutch housing comprising a plate centrally journaled on the shaft and a capstan carried by the plate, said plate having a plurality of magnets projecting therefrom, a spider within the housing having a hub splined to the shaft; a collar on the shaft between the hub and said plate, a coil spring compressed between the hub of the spider and said collar, a sleeve, said sleeve being externally threaded in the small end of the capstan and telescoped over the shaft, one end of the sleeve having a hand wheel and the other end of the sleeve bearing against said hub; and means to variably couple the spider and said housing in power-transmitting engagement, said latter means comprising an annulus of paramagnetic material having an over layer of non-magnetic metal carried on the spider, said magnets of said plate fronting on the non-magnetic metal.

3. A clutch assembly comprising a driving shaft, a clutch housing journaled and free-running on the shaft, a spider including a felly and having a hub which hub is slidably but non-rotatably secured with the shaft so that the felly of the spider and the housing are relatively axially adjustable to provide an air gap therebetween, said housing extending over said spider enclosing the spider and having an axial opening, cooperable means carried by the felly and housing to magnetically couple the felly with the housing, and means extending through said axial opening of said housing to fixedly adjust the axial position of the spider and the air gap between the felly and housing comprising an adjustable element carried by said housing and cooperating with said hub to provide adjustable axial displacement of the spider.

4. A clutch assembly comprising a shaft, a clutch housing including a plate journaled on the shaft and a capstan carried by the plate, a spider within the housing having a hub which is slidably but non-rotatably secured with the shaft and also having a felly which fronts on said plate, said housing extending over said spider enclosing the spider and having an axial opening, magnetic means carried by the plate projecting from the plate toward the felly with their magnetic axes parallel to the longitudinal axis of the shaft, an annulus of paramagnetic material and an over layer of non-magnetic metal carried on the felly of the spider, said non-magnetic metal fronting on the magnetic means and defining an air gap therewith, and means to fixedly adjust the axial position of the spider and the air gap between the felly and magnetic means comprising an adjustable element carried by said housing extending through said axial opening and cooperating with said hub to provide adjustable axial displacement of the spider with relation to said magnetic means.

References Cited in the file of this patent

UNITED STATES PATENTS

| | | |
|---|---|---|
| 896,868 | Steckel | Aug. 25, 1908 |
| 2,132,573 | McDonald | Oct. 11, 1938 |
| 2,488,079 | De Lauvaud et al. | Nov. 15, 1949 |
| 2,519,882 | Bullard | Aug. 22, 1950 |
| 2,566,743 | Okulitch | Sept. 4, 1951 |
| 2,607,820 | Judd | Aug. 19, 1952 |
| 2,717,743 | Eames | Sept. 13, 1955 |
| 2,824,244 | Zozulin | Feb. 18, 1958 |

FOREIGN PATENTS

| | | |
|---|---|---|
| 426,803 | France | May 12, 1911 |
| 682,124 | Great Britain | Nov. 5, 1952 |